United States Patent [19]
Nakayama et al.

[11] Patent Number: 5,822,282
[45] Date of Patent: Oct. 13, 1998

[54] MAGNETO-OPTICAL RECORDING MEDIUM HAVING A PLURALITY OF MAGNETIC LAYERS FOR USE IN LIGHT MODULATION TECHNIQUE

[75] Inventors: Junichiro Nakayama; Michinobu Mieda, both of Shiki-gun; Junji Hirokane; Akira Takahashi, both of Nara, all of Japan

[73] Assignee: Sharp Kabushiki Kaisha, Osaka, Japan

[21] Appl. No.: 779,774

[22] Filed: Jan. 7, 1997

[30]     Foreign Application Priority Data

Jan. 22, 1996 [JP] Japan ................................. 8-008196

[51] Int. Cl.$^6$ ..................................................... G11B 11/00
[52] U.S. Cl. ............... 369/13; 428/694 RE; 428/694 EC
[58] Field of Search .......................... 369/13, 14; 360/59, 360/114; 365/122; 428/694 ML, 694 MM, 694 EC, 694 RE

[56]               References Cited

U.S. PATENT DOCUMENTS

| | | | |
|---|---|---|---|
| 5,428,585 | 6/1995 | Hirokane et al. ......................... | 369/13 |
| 5,554,436 | 9/1996 | Katayama et al. ........................ | 369/13 |
| 5,623,458 | 4/1997 | Matsumoto et al. ...................... | 369/13 |
| 5,631,096 | 5/1997 | Nakajima et al. ........................ | 369/13 |

OTHER PUBLICATIONS

Nakayama, J., et al., "Magneto–Optical Recording Medium", Japanese Laid–Open Patent Publication No. Tokukaihei 6–251443, Laid Open on Sep. 9, 1994.

Japanese Laid–Open Patent Publication No. Tokukohei 5–22303, Laid Open on Mar. 29, 1993.

M. Kaneko, et al. "The Interface Wall Structure of Magnetic Triple–Layer Film for Overwriting by Light Intensity Modulation", Proc. Int. Symp. on Optical Memory, *Japanese Journal of Applied Physics*, vol. 28, Aug. 31, 1989, pp. 27–31.

*Primary Examiner*—Tan Dinh
*Attorney, Agent, or Firm*—David G. Conlin; William J. Daley, Jr.

[57]                ABSTRACT

A magneto-optical recording medium has at least a substrate, a first magnetic layer, a second magnetic layer, and a first interface layer provided between the first and second magnetic layers. The first magnetic layer exhibits a perpendicular magnetic anisotropy from room temperature to a Curie temperature thereof. The second magnetic layer has a coercive force lower than A: that of the first magnetic layer at room temperature, has a Curie temperature higher than that of the first magnetic layer, and exhibits a perpendicular magnetic anisotropy from room temperature to a Curie temperature of the second magnetic layer. The first interface layer is made of at least one rare-earth metal and has a thickness of several atoms. With this arrangement, it is possible (1) to carry out light modulation overwriting with respect to the magneto-optical recording medium, (2) to carry out initialization without an initializing magnetic field, and (3) to stabilize recording bits.

20 Claims, 6 Drawing Sheets

MAGNETO-OPTICAL RECORDING MEDIUM HAVING A PLURALITY OF MAGNETIC LAYERS FOR USE IN LIGHT MODULATION TECHNIQUE

FIELD OF THE INVENTION

The present invention relates to a magneto-optical recording medium, such as a magneto-optical disk, or a magneto-optical card, which carries out at least one of optical recording, reproduction, and erasion of information.

BACKGROUND OF THE INVENTION

The magneto-optical recording method is a method for recording and reproducing, in a manner described below, to and from a recording medium composed of a substrate and a perpendicularly-magnetized film made of a magnetic substance which is formed on the substrate.

The recording operation begins with initialization of the recording medium by a strong external magnetic field or the like, whereby the magnetization of the recording medium is directed in one specific direction (either upward or downward). Thereafter, a laser beam is projected on an area where information is to be recorded, so that the area of the recording medium is heated to not lower than around a Curie temperature of the magnetic film or not lower than around a compensation temperature of the magnetic film. As a result, the heated area of the magnetic film has no coercive force (Hc), or substantially no coercive force (Hc). In this state, an external magnetic field (bias magnetic field) with a magnetization direction opposite to that of the magnetization for the initialization is applied so that the magnetization direction of the area is reversed. When the projection of the laser beam is suspended, the temperature of the recording medium falls to the room temperature, whereby the magnetization thus reversed is fixed. Thus, information is thermal-magnetically recorded.

For reproducing information, a linearly polarized laser beam is projected on the recording medium, so that optical reading-out of information is carried out by making use of a phenomenon that the plane of polarization of reflected light or transmitted light of the laser beam rotates in accordance with the magnetization direction (the magnetic Kerr effect, and the magnetic Faraday effect).

The magneto-optical recording medium has been viewed with interest as a rewritable high density and large capacity memory element. As a method for reusing (rewriting) such a recording medium, a so-called light modulation overwriting method has been proposed. According to this method, overwriting by modulating the light intensity is carried out with respect to a recording medium which has a recording layer composed of two exchange-coupled films, with the use of an initializing magnetic field (Hi) and a recording magnetic field (Hw).

Figure 9:
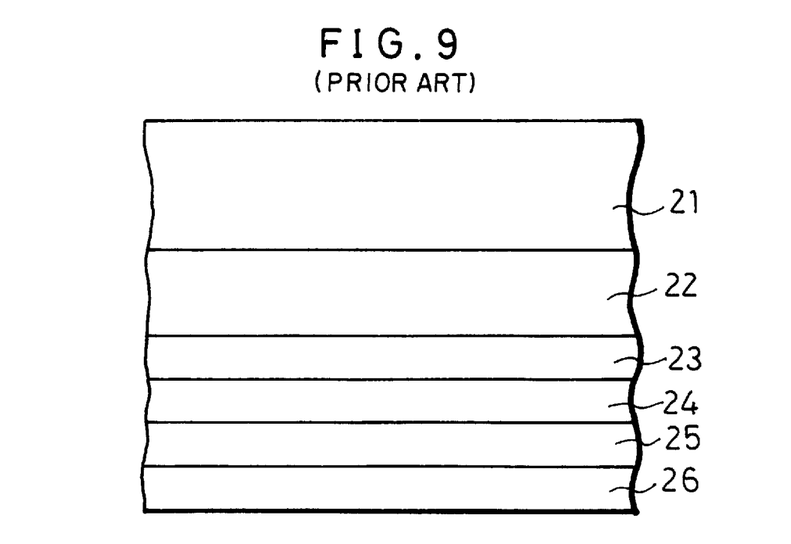
FIG. 9 is a schematic view illustrating an arrangement of a magneto-optical disk as a conventional magneto-optical recording medium.

The following description will discuss a procedure of an overwriting operation with respect to a magneto-optical recording medium proposed in the Japanese Examined Patent Publication 5-22303/1993. As shown in FIG. 9, a recording layer of the recording medium disclosed in the publication is triplicated with an intermediate magnetic layer 24 being provided between a first magnetic layer 23 and a second magnetic layer 25, so that the initializing magnetic field (Hi) is allowed to be smaller and that the recording medium has superiority in the stability of recording bits.

Figure 10:
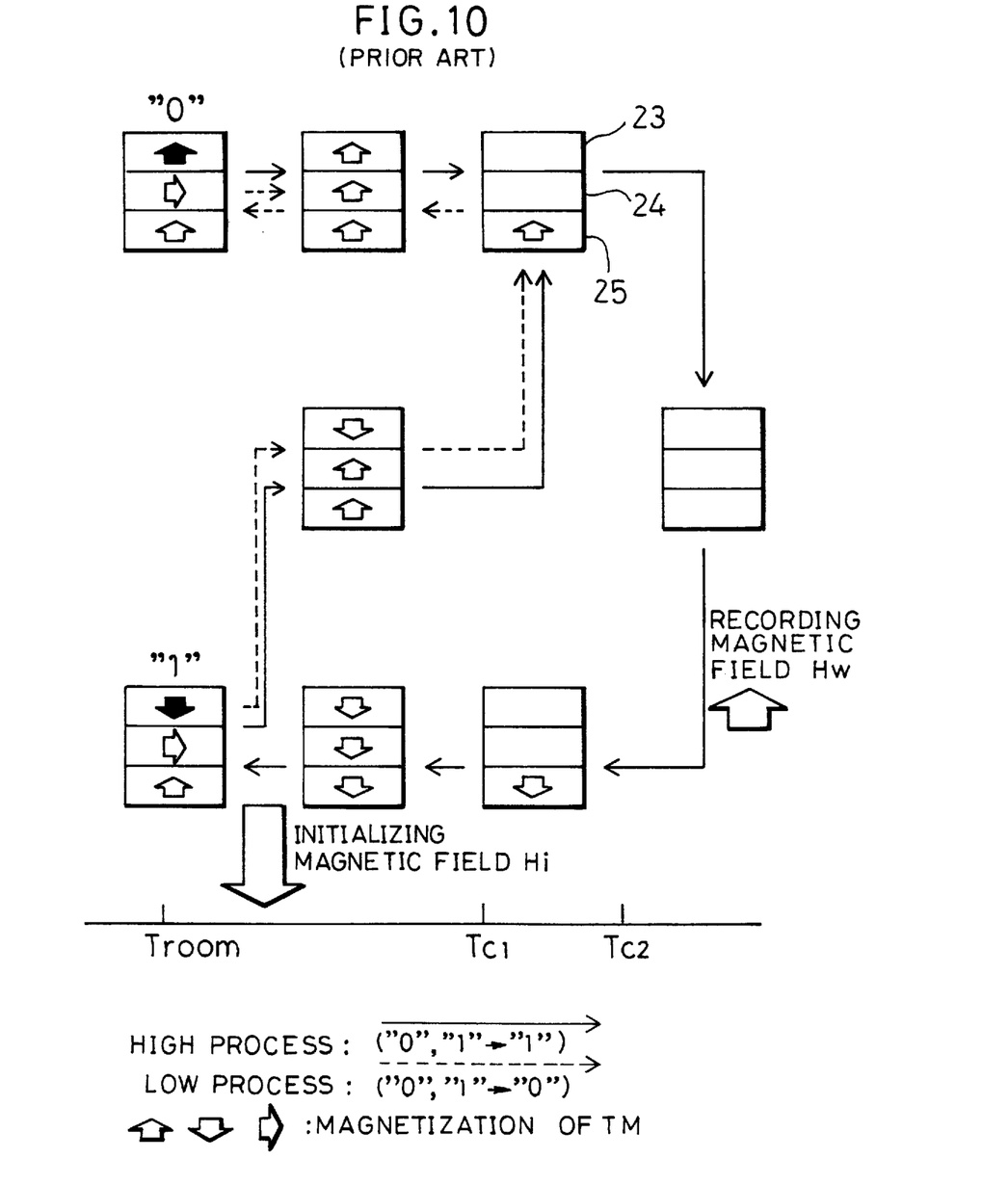
FIG. 10 is a view illustrating respective magnetic conditions of the first and second magnetic layers of the conventional magneto-optical disk in a recording process.

FIG. 10 is a view illustrating states of respective magnetizations of the first magnetic layer 23, the intermediate magnetic layer 24, and the second magnetic layer 25, wherein the horizontal axis indicates temperature. Since the layers are rare earth-transition metal alloys, each has a total magnetization and respective sub-lattice magnetizations of the rare-earth metal and the transition metal. Voided arrows represent the respective directions of the transition metal sub-lattice magnetizations of the first, intermediate, and second magnetic layers.

Initialization is carried out by applying the initializing magnetic field Hi so that only the magnetization direction of the second magnetic layer 25 is directed in one specific direction (upward in the figure). Since a strength of the initializing magnetic field Hi is smaller than that of a coercive force of the first magnetic layer 23 at room temperature while greater than that of a coercive force of the second magnetic layer 25 at room temperature, the magnetization direction of the first magnetic layer 23 is not reversed. The intermediate magnetic layer 24 has an in-plane magnetic anisotropy at room temperature. Therefore, it has an effect of preventing exchange-coupling between the first magnetic layer 23 and the second magnetic layer 25.

Recording is carried out by applying the recording magnetic field Hw while projecting the laser beam whose light intensity is modulated either to a high power or a low power. The high power of the laser beam is set so that the projection of the high power laser beam causes the recording medium to be heated to the vicinity of a Curie temperature of the second magnetic layer 25. The low power of the laser beam is set so that the projection of the low power laser beam causes the recording medium to be heated to the vicinity of a Curie temperature of the first magnetic layer 23.

Therefore, with the projection of the high power laser beam, the magnetization direction of the second magnetic layer 25 is reversed downward by the recording magnetic field Hw. The magnetization direction of the second magnetic layer 25 is copied, by the exchange coupling force exerted to an interface in the cooling process, to the intermediate magnetic layer 24 having a perpendicular magnetic anisotropy, and then to the first magnetic layer 23. As a result, the magnetization a direction of the first magnetic layer 23 is directed downward.

On the other hand, with the projection of the low power laser beam, the magnetization direction of the second magnetic layer 25 is not reversed by the recording magnetic field Hw, since in such a state a strength of the coercive force of the second magnetic layer 25 is greater than that of the recording magnetic field Hw. The magnetization direction of the first magnetic layer 23 is directed in the same direction as that of the magnetization of the second magnetic layer 25 by the exchange-coupling force exerted to the interface in the cooling process, as described above. Therefore, the magnetization of the first magnetic field 23 has an upward direction.

The reproduction-use laser power is set to a considerably lower level than the recording-use low power.

The above-described conventional technology thus has enabled to provide a magneto-optical recording medium (1) to which the light modulation overwriting method is applicable, (2) which allows an initializing magnetic field to be relatively small, and (3) which is superior in the stability of the recording bits. The technology, however, has still presented a problem that the initializing magnetic field Hi greater than the recording magnetic field Hw is necessary, which leads to a problem that the recording/reproducing apparatuses cannot be miniaturized.

Furthermore, since an apparatus in accordance with the standards of the International Organization for Standization (ISO) which does not generate an initializing magnetic field great enough to be used with the conventional disk-type magneto-optical recording medium, arises a problem that the conventional magneto-optical recording medium cannot be compatible with other recording-reproducing apparatuses in accordance with the ISO Standard.

SUMMARY OF THE INVENTION

An object of the present invention is to provide a magneto-optical recording medium, (1) which allows the light modulation overwriting method to be applied to the same, (2) which is superior in the stability of recording bits, (3) which virtually necessitates no initializing magnetic field, (4) which ensures miniaturization of the recording/reproducing apparatus for use with the same, and (5) which has compatibility with other recording/reproducing apparatuses.

Another object of the present invention is to provide a magneto-optical recording method, (1) which allows the light modulation overwriting method to be applied, (2) which allows to achieve superior stability of recording bits, (3) which virtually necessitates no initializing magnetic field, (4) which ensures miniaturization of the recording/reproducing apparatus for use with the same, and (5) which allows a recording/reproducing apparatus to have compatibility with other recording/reproducing apparatuses.

To achieve the above object, a first magneto-optical recording medium of the present invention is characterized in having (1) a substrate, (2) a first magnetic layer exhibiting a perpendicular magnetization from room temperature to a Curie temperature thereof, (3) a first interface layer being made of at least one rare earth metal and having a thickness of several atoms, and (4) a second magnetic layer having a smaller coercive force than that of the first magnetic layer at room temperature, having a Curie temperature higher than that of the first magnetic layer, and exhibiting a perpendicular magnetization from room temperature to around a Curie temperature of the second magnetic layer, the substrate, the first magnetic layer, the interface layer, and the second magnetic layer being provided in this order.

With this arrangement, it is possible to provide the magneto-optical recording medium to which the light modulation overwriting method is applicable and which is superior in the stability of the recording bits. Besides, since the magnetization of the second magnetic layer is directed in one specific direction before recording with the use of a magnetic field having a strength substantially the same as that of the recording magnetic field, a magnetic field exclusively for initialization is virtually unnecessary. Therefore, rises in manufacturing costs of recording devices can be avoided.

A second magneto-optical recording medium of the present invention has the following characteristics, in addition to the same characteristics as those of the first magneto-optical recording medium: the first magnetic layer, made of a rare earth-transition metal alloy, is transition metal rich from room temperature to a Curie temperature thereof; and the second magnetic layer, made of a rare earth-transition metal alloy, has a compensation temperature falling in a temperature range between room temperature and the Curie temperature thereof.

With the described arrangement, it is possible to direct the magnetization direction of the second magnetic layer in one specific direction, solely by applying a recording magnetic field which has a strength required for reversing the magnetization direction of the second magnetic layer at a temperature around the compensation temperature of the second magnetic layer. In other words, the strength of the initializing magnetic field for directing the magnetization direction of the second magnetic layer may be set not greater than that of the recording magnetic field, and the initializing magnetic field may have the same direction as that of the recording magnetic field. Therefore, the recording magnetic field can be utilized as the initializing magnetic field. This virtually ensures initialization without an initializing magnetic field, whereas this ensures the compatibility with other recording/reproducing apparatuses and the application of the light modulation overwriting method. Therefore, this makes it unnecessary to direct the magnetization of the second magnetic layer in one specific direction before shipment or recording.

A third magneto-optical recording medium of the present invention has the following characteristics, in addition to those of the first magneto-optical recording medium: the first magnetic layer is made of a rare earth-transition metal alloy; and the second magnetic layer, made of a rare earth-transition metal alloy, has a compensation temperature around a reproduction temperature, the reproduction temperature being a temperature to which an area of the magneto-optical recording medium is heated so that information is reproduced therefrom.

In addition to enabling the application of the light modulation overwriting method to the magneto-optical recording medium, the arrangement ensures that the magnetization of the second magnetic layer is hardly copied to the first magnetic layer during reproducing operations, thereby further smoothing the application of the light modulation overwriting method.

A fourth magneto-optical recording medium of the present invention, having the same configuration as that of the first magneto-optical recording medium, further includes a reproduction magnetic layer provided on a first surface of the first magnetic layer, the first magnetic layer having the first surface and a second surface, the first surface being opposite to the second surface on which side the second magnetic layer is provided. The reproduction magnetic layer has a Curie temperature higher than that of the first magnetic layer and exhibits a perpendicular magnetization from room temperature to the Curie temperature thereof.

With this arrangement, the light modulation overwriting is made feasible, and reproduction signal characteristics are enhanced during reproducing operations since a Kerr rotation angle of the reproduction magnetic layer is great.

A fifth magneto-optical recording medium of the present invention, having the same configuration as that of the first magneto-optical recording medium, further includes a reproduction magnetic layer provided on a first surface of the first magnetic layer, the first magnetic layer having the first surface and a second surface, the first surface being opposite to the second surface on which side the second magnetic layer is provided. The reproduction magnetic layer has a Curie temperature higher than that of the first magnetic layer and exhibits an in-plane magnetization at room temperature and a perpendicular magnetization at a temperature higher than a predetermined temperature falling in a range between the room temperature and the Curie temperature of the first magnetic layer.

With this arrangement, the light modulation overwriting is made feasible. Besides, when a light beam is projected during a reproducing operation, an irradiated area has a substantial Gaussian temperature distribution. Therefore, temperature rises in a central portion of the irradiated area, a diameter of the central portion is smaller than the diameter of the light beam. With this temperature rise, a transition from an in-plane magnetization to a perpendicular magnetization occurs in the magnetization of the area having the temperature rise in the reproduction magnetic layer. Therefore, only the area having the temperature rise has the polar Kerr effect. As a result, reproduction with respect to a recording bit smaller than a conventional one is enabled, thereby improving the recording density.

A sixth magneto-optical recording medium of the present invention, having the same configuration as that of the fourth or fifth magneto-optical recording medium, further includes a second interface layer which is made of at least one rare-earth metal and has a thickness of several atoms, the second interface layer being provided between the first magnetic layer and the reproduction magnetic layer.

With the above described arrangement, either the reproduction signal characteristics are improved, or the recording density is improved. Furthermore, the light modulation overwriting can be smoothly carried out.

A seventh magneto-optical recording medium of the present invention, having the same configuration as that of the first magneto-optical recording medium, further includes (1) a supplementary magnetic layer made of a soft magnetic substance and (2) a third interface layer, made of at least one rare-earth metal, having a thickness of several atoms. The third interface layer and the supplementary magnetic layer are provided in this order on a first surface of the second magnetic layer, the second magnetic layer having the first surface and a second surface, the first surface being opposite to the second surface on which side the first magnetic layer is provided.

With the above arrangement, the light modulation overwriting is enabled. Besides, the thickness of the second magnetic layer can be reduced, thereby causing the recording sensitivity to be enhanced.

A first magneto-optical recording method of the present invention for carrying out light modulation overwriting with respect to the first magneto-optical recording medium includes the steps of (a) modulating light intensity of a laser beam to a low level with which an irradiated area of the magneto-optical recording medium is heated to a temperature not lower than around the Curie temperature of the first magnetic layer, and projecting the laser beam to the magneto-optical recording medium, and (b) modulating light intensity of the laser beam to a high level with which an irradiated area of the magneto-optical recording medium is heated to a temperature not lower than around the Curie temperature of the second magnetic layer, and projecting the laser beam to the magneto-optical recording medium.

By the foregoing method, recording of information is enabled with respect to the magneto-optical recording medium (1) which allows the light modulation overwriting method to be applied to the same, (2) which is superior in the stability of recording bits, and (3) in which the magnetization of the second magnetic layer can be directed in one specific direction with the use of a magnetic field having a strength substantially the same as that of the recording magnetic field.

For a fuller understanding of the nature and advantages of the invention, reference should be made to the ensuing detailed description taken in conjunction with the accompanying drawings.

DESCRIPTION OF THE PREFERRED EMBODIMENTS

[First Embodiment]

Figure 1:
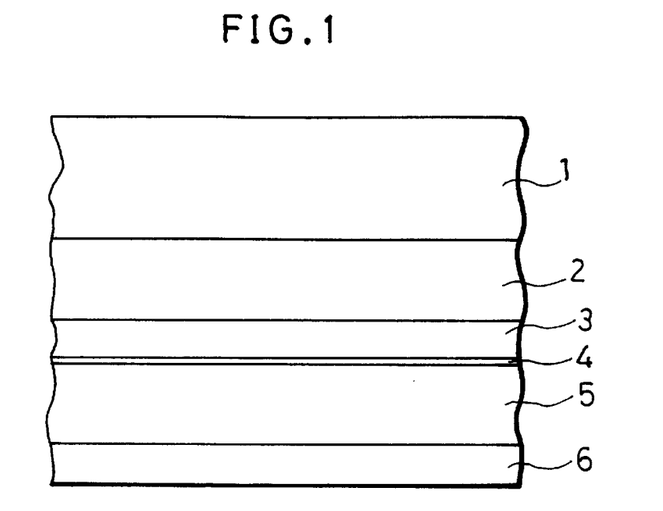
FIG. 1 is a schematic view illustrating an arrangement of a magneto-optical disk as a magneto-optical recording medium of the present invention.
Figure 2:
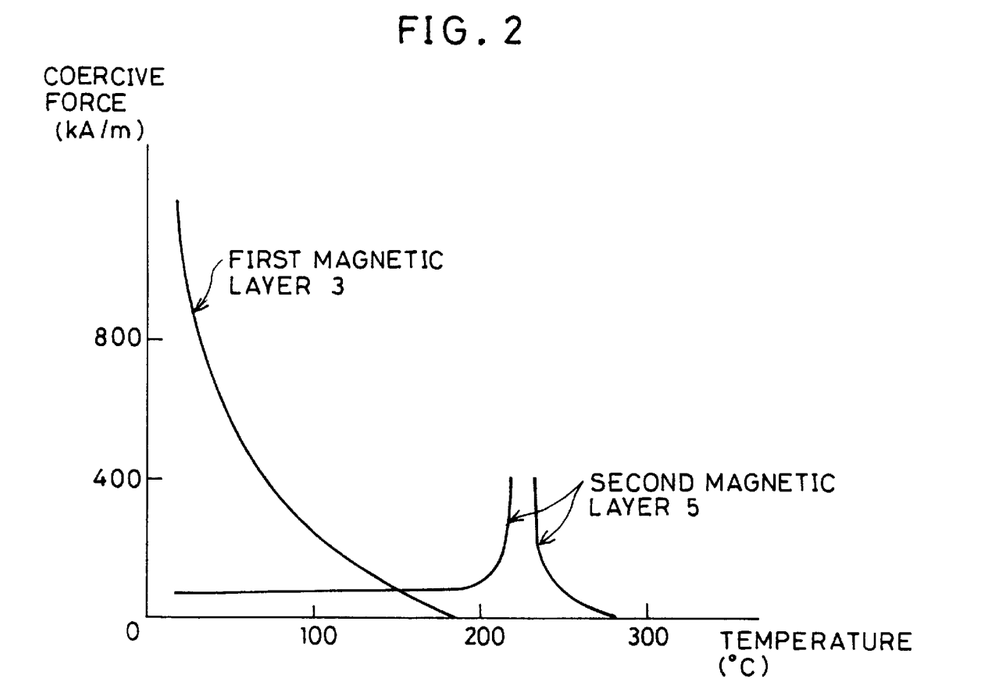
FIG. 2 is a graph illustrating temperature dependence of coercive forces of first and second magnetic layers of the magneto-optical recording disk illustrated in FIG. 1.
Figure 3:
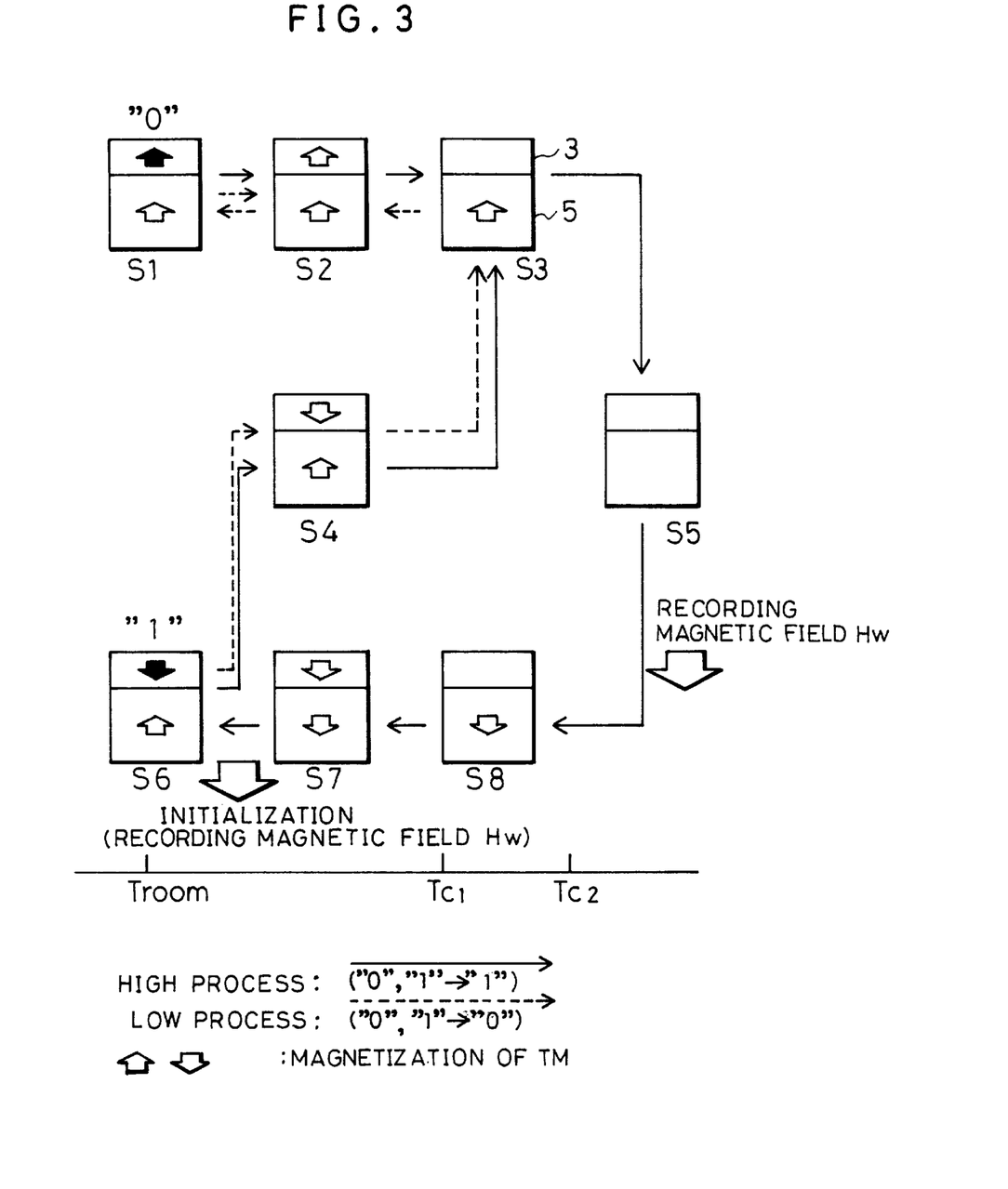
FIG. 3 is a view illustrating respective magnetic conditions of the first and second magnetic layers of the magneto-optical disk illustrated in FIG. 1, in a recording process.

The following description will discuss an embodiment of the present invention, with reference to FIGS. 1 through 3.

A magneto-optical disk (magneto-optical recording medium) of the present embodiment includes a translucent substrate 1. On the translucent substrate 1, there are provided a translucent dielectric layer 2, a first magnetic layer 3, a first interface layer 4, a second magnetic layer 5, a protective layer 6, and an overcoat layer (not shown), which are laminated in this order, as shown in FIG. 1. The first and second magnetic layers 3 and 5 are made of respective rare earth-transition metal alloys.

The first magnetic layer 3 is arranged so that (1) it has a lower Curie temperature $Tc_1$, and a greater coercive force $Hc_1$ at room temperature, compared with the second magnetic layer 5, (2) it has a perpendicular magnetization from room temperature to its Curie temperature $Tc_1$, and (3) it is transition metal rich at room temperature.

The second magnetic layer 5 is arranged so that (1) it has a Curie temperature $Tc_2$ higher than the Curie temperature $Tc_1$ of the first magnetic layer 3, and (2) it has a perpendicular magnetization from room temperature to its Curie temperature $Tc_2$, (3) it is rare-earth metal rich at room temperature, and (4) it has a compensation temperature falling in a temperature range from room temperature to its Curie temperature $Tc_2$.

The first interface layer 4 is made of a rare-earth metal having a thickness of several atoms.

The following description will depict a recording process, with reference to FIG. 3. FIG. 3 illustrates the respective states of the magnetizations of the first and second magnetic layers 3 and 5. The horizontal axis in the figure indicates temperature. Since these layers are made of respective rare earth-transition metal alloys, each layer has a total magnetization and respective sub-lattice magnetizations of the rare-earth metal and the transition metal. The voided arrows in the figure indicate directions of the sub-lattice magnetizations of the transition metals of the respective layers.

In order to carry out the light modulation overwriting with respect to the foregoing recording medium, the light intensity of the laser beam is modulated in accordance with information while the recording magnetic field Hw is applied to an area on the recording medium where the laser beam is projected. The modulation of the light intensity of the laser beam has the following two processes. In one of the processes, the area irradiated by the laser beam is heated to around the Curie temperature $Tc_2$ of the second magnetic layer 5 (hereinafter referred to as "high temperature process"). In the other process, the area irradiated by the laser beam is heated to around the Curie temperature of $Tc_1$ of the first magnetic layer 3 (hereinafter referred to as "low temperature process"). By selectively repeating the two processes, overwriting of information is carried out so as to rewrite information.

At room temperature, two stable states exist, one being a state "0" (magnetization direction: upward) (state S1), and the other being a state "1" (magnetization direction: downward) (state S6).

In the high temperature process, the laser beam with a high power (Ph) is projected. When the respective magnetic layers are heated to around $Tc_2$, the first magnetic layer 3 has no magnetization (in the state S3), while a strength of the coercive force of the second magnetic layer 5 becomes smaller than that of the recording magnetic field Hw. Therefore, the magnetization direction of the second magnetic layer 5 is directed in one direction (downward in this case) in accordance with the recording magnetic field Hw having a direction which is downward in the figure. Since the second magnetic layer 5 is transition metal rich at a temperature in the vicinity of $Tc_2$, the sub-lattice magnetization of the transition metal has the same direction as that of the recording magnetic field Hw, namely, downward in FIG. 3. Thus, the state S1 shifts to the state S2, to the state S3, then to the state S5, and finally to the state S8, while the state S6 shifts to the state S4, to the state S3, then to the state S5, and finally to the state S8.

When the area having been irradiated by the laser beam becomes out of the scope of the projection of the laser beam due to the rotation of the magneto-optical disk, thereby being cooled down, the first magnetic layer 3 comes to have a magnetization. In this state, the sub-lattice magnetization of the first magnetic layer 3 is directed in the sub-lattice magnetization direction of the second magnetic layer 5 by the exchange-coupling force exerted on the interface therebetween, and exhibits the state "1" (magnetization direction: downward). Therefore, the state S8 shifts to the state S7. When the area having been irradiated by the laser beam is further cooled down to room temperature, the second magnetic layer 5 becomes rare-earth metal rich. Therefore, the sub-lattice magnetization of the transition metal of the second magnetic layer 5 comes to have a direction (upward in this case) opposite to that of the total magnetization, which is directed downward in accordance with the recording magnetic field Hw. Thus, the state S7 shifts to the state S6. Thus, on the completion of the recording process, the magnetization direction of the second magnetic layer 5 is directed in one specific direction by the recording magnetic field Hw, whereby initialization is completed. Note that since the first magnetic layer 3 has a sufficiently great coercive force as is clear from FIG. 2, the magnetization direction of the second magnetic layer 5 is not transferred to the first magnetic layer 3.

In the low temperature process, the laser beam with a low power (Pl) is projected to the magneto-optical disk in the state S1 or the state S6, so that an irradiated area of the magneto-optical disk is heated up to the temperature $Tc_1$. Namely, the state S1 and the state S6 shift to the state S3, through the state S2 and the state S4, respectively. In this case, since a strength of the coercive force of the second magnetic layer 5 is greater than that of the recording magnetic field Hw, the magnetization direction of the second magnetic layer 5 is not reversed by the external magnetic field Hw, and the sub-lattice magnetization of the second magnetic layer 5 remains directed upward.

When the area having been irradiated by the laser beam becomes out of the scope of the projection of the laser beam due to the rotation of the magneto-optical disk and is cooled down, the sub-lattice magnetization of the first magnetic layer 3 is directed in the direction of the sub-lattice magnetization of the second magnetic layer 5 due to the exchange-coupling force exerted on the interface therebetween, and exhibits the state "0" (magnetization direction: upward). Therefore, the state S3 shifts to the state S2. When the area having been irradiated by the laser beam is further cooled down to room temperature, the state of the magnetization is maintained. Therefore, the state S2 shifts to the state S1.

As has been described so far, the first magnetic layer 3 comes to exhibit the state S6, namely, the state "1" (magnetization direction: downward) in the high temperature process, while the first magnetic layer 3 comes to exhibit the state S1, namely, the state "0" (magnetization direction: upward) in the low temperature process. Thus, the light modulation overwriting is carried out.

So as to reproduce information, the laser beam having a reproduction-use power (Pr) is projected, and rotatory polarization of light reflected by the first magnetic layer 3 is detected. Note that since each magnetic layer is heated to a temperature considerably lower than that in the low temperature process, information recorded in the first magnetic layer 3 is by no means erased by the laser beam having a reproduction-use power.

In the present embodiment, a conventional initializing magnetic field which is very strong is unnecessary, and only a magnetic field with the same strength as that of the recording magnetic field Hw, which is considerably smaller than that of the conventional initializing magnetic field, is needed, for carrying out the initializing operation wherein the magnetization direction of the second magnetic layer 5 is directed in one specific direction. In addition, the respective recording-use and initializing magnetic fields have the same direction (downward in FIG. 3). Therefore, since the initialization of the magnetization direction of the second magnetic layer 5 can be carried out by applying the recording magnetic field Hw, the recording magnetic field Hw can be used as the initializing magnetic field. In other words, it is possible to give the recording magnetic field Hw both the possible to give the external magnetic field Hw the both roles of (1) reversing the magnetization direction of the second magnetic layer 5 in the high temperature process and (2) directing the magnetization direction of the second magnetic layer 5 in a specific direction of the initialization (downward in FIG. 3) at the end of the high temperature process. With this arrangement, a device for generating a strong initializing magnetic field which has been indispensable in conventional arrangements is unnecessary.

Therefore, it is possible to carry out recording and reproduction with respect to the magneto-optical disks of the present embodiment even with the use of a conventional recording/reproducing apparatus not equipped with a device for generating a great initializing magnetic field, such as a recording/reproducing apparatus in accordance with the standard. Therefore, the magneto-optical disk of the present invention (1) allows light modulation overwriting method to be applied thereto, (2) has compatibility with the magneto-optical recording/reproducing apparatuses in accordance with the ISO standard, and (3) does not require a device exclusively for generating the initializing magnetic field in addition to a device for generating the recording magnetic field. Besides, since a device for generating the initializing magnetic field is unnecessary, rises in manufacturing costs of the recording device can be avoided.

The following description will show magneto-optical disk samples as examples of the magneto-optical recording medium.

Each of magneto-optical disks of samples #1 and #2 has a disk-shaped translucent substrate 1 made of glass with an outer diameter of 86 mm, an inner diameter of 15 mm, and a thickness of 1.2 mm. A concavo-convex guide track for guiding the laser beam is formed directly on one surface of the substrate 1 by an reactive ion etching method. The track has a track pitch of 1.6 $\mu$m, a groove width of 0.8 $\mu$m, and a land width of 0.8 $\mu$m.

On the surface of the substrate 1 where the guide track is formed, a dielectric layer 2 with a thickness of 80 nm, a first magnetic layer 3 with a thickness of 40 nm, a first interface layer 4 with a thickness of 1 nm, a second magnetic layer 5 with a thickness of 120 nm, and a protective layer 6 with a thickness of 20 nm are laminated in this order. The dielectric layer 2, made of AlN, was formed by a reactive sputtering method. The first magnetic layer 3, made of DyFeCo, was formed by a simultaneous sputtering method using Dy, Fe, and Co targets. The first interface layer 4, made of Gd, was formed by the sputtering method using a Gd target. The second magnetic layer 5, made of GdDyFeCo, was formed by the simultaneous sputtering method using Gd, Dy, Fe, and Co targets. The protective layer 6 is made of AlN.

Sputtering conditions of the first magnetic layer 3, the first interface layer 4, and the second magnetic layer 5 are as follows:

ultimate vacuum=not more than $2.0 \times 10^{-4}$ Pa;

Argon gas pressure=$6.5 \times 10^{-1}$ Pa; and discharge power=300 W.

Sputtering conditions of the dielectric layer 2 and the protective layer 6 are as follows:

ultimate vacuum=not more than $2.0 \times 10^{-4}$ Pa;

nitrogen gas pressure=$3.0 \times 10^{-1}$ Pa; and discharge power=800 W.

An acrylic ultraviolet ray hardening resin is provided over the protective layer 6, and it is hardened with the projection of ultraviolet ray, so that an overcoat film is provided.

The first magnetic layer 3 of the magneto-optical disk of sample #1 which is made of $Dy_{0.20}(Fe_{0.85}Co_{0.15})_{0.80}$ is transition metal rich and has the following properties:

Curie temperature $Tc_1$=180° C.; and coercive force $Hc_1$ at room temperature=1200 kA/m.

The second magnetic layer 5 of the magneto-optical disk of sample #1 which is made of $(Gd_{0.94}Dy_{0.06})_{0.26}(Fe_{0.80}Co_{0.20})_{0.74}$ is rare-earth metal rich and has the following properties:

Curie temperature $Tc_2$=275° C.;

compensation temperature $T_{comp2}$=75° C.; and coercive force $Hc_2$ at room temperature=36 kA/m.

A recording operation was carried out with respect to the magneto-optical disk of sample #1, under the following conditions:

strength of recording magnetic field Hw=40 kA/m;

high power Ph of laser beam=10 mW;

low power Pl of laser beam=1 mW;

reproduction power Pr of laser beam=1 mW; and recording bit length=0.78 $\mu$m.

As a result, the light modulation overwriting could be carried out without inadequate erasing of pre-recorded information.

The first magnetic layer 3 of the magneto-optical disk of sample #2 which is made of $Dy_{0.20}(Fe_{0.85}Co_{0.15})_{0.80}$ is transition metal rich and has the following properties:

Curie temperature $Tc_1$=180° C.; and coercive force $Hc_1$ at room temperature=1200 kA/m.

The second magnetic layer 5 of the magneto-optical disk of sample #2 which is made of $(Gd_{0.97}Dy_{0.03})_{0.26}(Fe_{0.80}Co_{0.20})_{0.74}$ is rare-earth metal rich and has the following properties:

Curie temperature $Tc_2$=275° C.;

compensation temperature $T_{comp2}$=75° C.; and coercive force $Hc_2$ at room temperature=24 kA/m.

A recording operation was carried out with respect to the magneto-optical disk of sample #2, under the following conditions:

strength of recording magnetic field Hw=32 kA/m;

high power Ph of laser beam=10 mW;

low power Pl of laser beam=1 mW;

reproduction power Pr of laser beam=1 mW; and recording bit length=0.78 $\mu$m.

As a result, the light modulation overwriting could be carried out without inadequate erasing of pre-recorded information.

[Second Embodiment]

Figure 4:
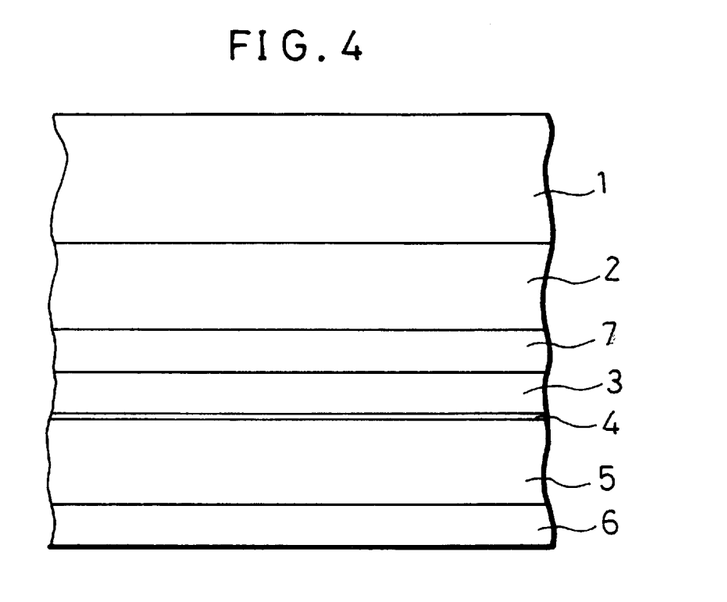
FIG. 4 is a schematic view illustrating an arrangement of another magneto-optical disk as a magneto-optical recording medium of the present invention.

The following description will discuss another embodiment of the present invention with reference to FIG. 4. The members having the same structure (function) as those in the above-mentioned embodiment will be designated by the same reference numerals and their description will be omitted.

As illustrated in FIG. 4, a magneto-optical disk (magneto-optical recording medium) of the present embodiment has the same configuration as that of the foregoing embodiment except that a reproduction magnetic layer 7 is provided between the dielectric layer 2 and the first magnetic layer 3. The reproduction magnetic layer 7 has a Curie temperature higher than that of the first magnetic layer 3, and exhibits a perpendicular magnetic anisotropy from room temperature to the Curie temperature thereof.

A magneto-optical disk sample as an example of the magneto-optical recording medium is depicted in the following description.

A magneto-optical disk of sample #3 has the same configuration as that of the magneto-optical disk of sample #1 of the first embodiment except that a reproduction magnetic layer 7 with a thickness of 30 nm is provided between the first magnetic layer 3 and the dielectric layer 2. The magneto-optical disk of sample #3 was produced by the same method as that for the sample #1. The reproduction magnetic layer 7 of the magneto-optical disk of sample #3, made of $Gd_{0.27}(Fe_{0.70}Co_{0.30})_{0.73}$, is rare-earth metal rich, and has the following properties:

Curie temperature>300° C.; and compensation temperature≈200° C.

A recording operation was carried out with respect to the magneto-optical disk of sample #3, under the following conditions:

strength of recording magnetic field Hw=50 kA/m;

high power Ph of laser beam=10 mW;

low power Pl of laser beam=1 mW;

reproduction power Pr of laser beam=1 mW; and recording bit length=0.78 μm.

As a result, the light modulation overwriting could be carried out without inadequate erasing of pre-recorded information. The magneto-optical disk of sample #3 had signal quality superior to that of the magneto-optical disk of sample #1. It can be considered that since the Curie temperature of the reproduction magnetic layer 7 was higher than the Curie temperature $Tc_1$ of the first magnetic layer 3, a Kerr rotation angle was made greater, thereby enhancing the signal quality.

[Third Embodiment]

Figure 5:
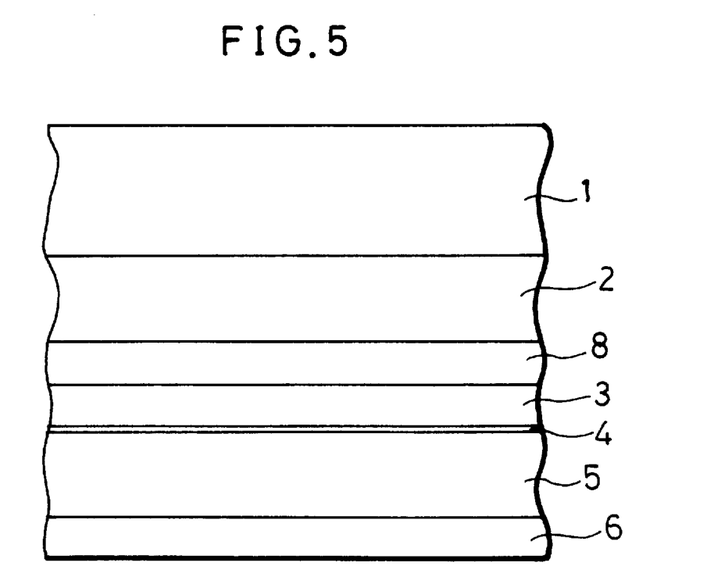
FIG. 5 is a schematic view illustrating an arrangement of still another magneto-optical disk as a magneto-optical recording medium of the present invention.

The following description will discuss another embodiment of the present invention with reference to FIG. 5. The members having the same structure (function) as those in the above-mentioned embodiment will be designated by the same reference numerals and their description will be omitted.

As illustrated in FIG. 5, a magneto-optical disk (magneto-optical recording medium) of the present embodiment has the same configuration as that of the foregoing embodiment except that a reproduction magnetic layer 8 is provided between the dielectric layer 2 and the first magnetic layer 3. The reproduction magnetic layer 8 has a Curie temperature higher than that of the first magnetic layer 3, and has substantially no coercive force at room temperature. It has an in-plane magnetic anisotropy at room temperature and a perpendicular magnetic anisotropy at a temperature higher than a predetermined temperature.

A magneto-optical disk sample as an example of the magneto-optical recording medium is depicted in the following description.

A magneto-optical disk of sample #4 has a reproduction magnetic layer 8 which has a thickness of 30 nm, between the first magnetic layer 3 and the dielectric layer 2 of sample #1. The magneto-optical disk of sample #4 was produced by the same method as that for the magneto-optical disk of sample #1. The reproduction magnetic layer 8 of the magneto-optical disk of sample #4, made of $Gd_{0.29}(Fe_{0.80}Co_{0.20})_{0.71}$, is rare-earth metal rich, and has the following properties:

Curie temperature=300 ° C.;

no compensation temperature; and a transition occurs from the in-plane magnetic anisotropy to the perpendicular magnetic anisotropy at around 120 ° C.

A recording operation was carried out with respect to the magneto-optical disk of sample #4, under the following conditions:

strength of recording magnetic field Hw=50 kA/m;

high power Ph of laser beam=10 mW;

low power Pl of laser beam=1 mW;

reproduction power Pr of laser beam=1 mW; and recording bit length=0.64 μm.

As a result, the light modulation overwriting could be carried out without inadequate erasing of pre-recorded information. The signal quality did not drop when the light modulation overwriting was carried out at a shorter recording bit with respect to the magneto-optical disk of sample #4, compared with the signal quality obtained with respect to the magneto-optical disk of sample #1. The reason can be considered as follows. The reproduction magnetic layer 8 had an in-plane magnetic anisotropy at room temperature, and during the projection of the laser beam with the reproduction-use power only a central portion of an area irradiated by the laser beam came to exhibit the perpendicular magnetic anisotropy. Therefore, transfer of a magnetization direction from the first magnetic layer 3 occurred only in the vicinity of the center of the irradiated area, thereby ensuring reproduction without affection from neighboring bits even though a recording bit was short.

[Fourth Embodiment]

Figure 6:
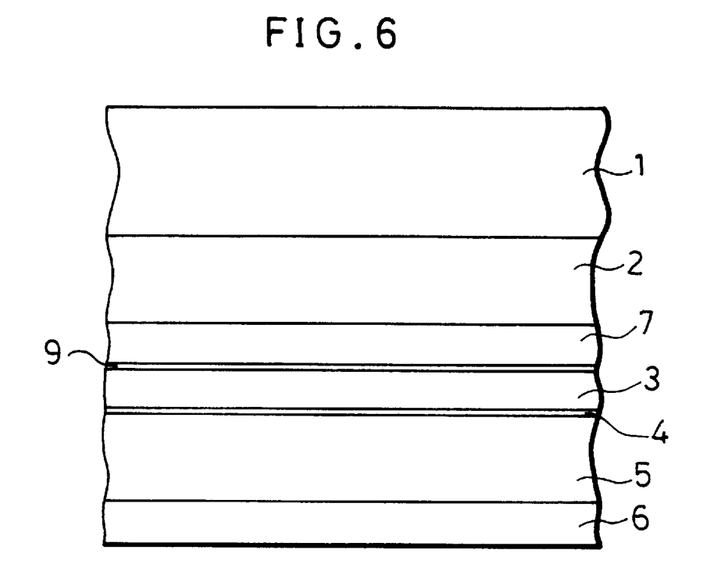
FIG. 6 is a schematic view illustrating an arrangement of still another magneto-optical disk as a magneto-optical recording medium of the present invention.

The following description will discuss another embodiment of the present invention with reference to FIG. 6. The members having the same structure (function) as those in the above-mentioned embodiment will be designated by the same reference numerals and their description will be omitted.

As illustrated in FIG. 6, a magneto-optical disk (magneto-optical recording medium) of the present embodiment has the same configuration as that of the second embodiment except that a second interface layer 9 is provided between the first magnetic layer 3 and the reproduction magnetic layer 7.

A magneto-optical disk sample as an example of the magneto-optical recording medium is depicted in the following description.

A magneto-optical disk of sample #5 has the second interface layer 9 which is made of Gd and has a thickness of 1 nm, between the first magnetic layer 3 and the reproduction magnetic layer 7 of sample #3.

A recording operation was carried out with respect to the magneto-optical disk of sample #5, under the following conditions:

strength of recording magnetic field Hw 40 kA/m;

high power Ph of laser beam 10 mW;

low power Pl of laser beam 1 mW;

reproduction power Pr of laser beam 1 mW; and recording bit length=0.78 μm.

As a result, the light modulation overwriting could be carried out without inadequate erasing of pre-recorded information, with the use of the recording magnetic field having a smaller strength than that for the magneto-optical disk of sample #3. It can be considered that since the second interface layer 9 made of Gd was provided between the first magnetic layer 3 and the reproduction magnetic layer 7, the light modulation overwriting could be carried out smoothly.

[Fifth Embodiment]

Figure 7:
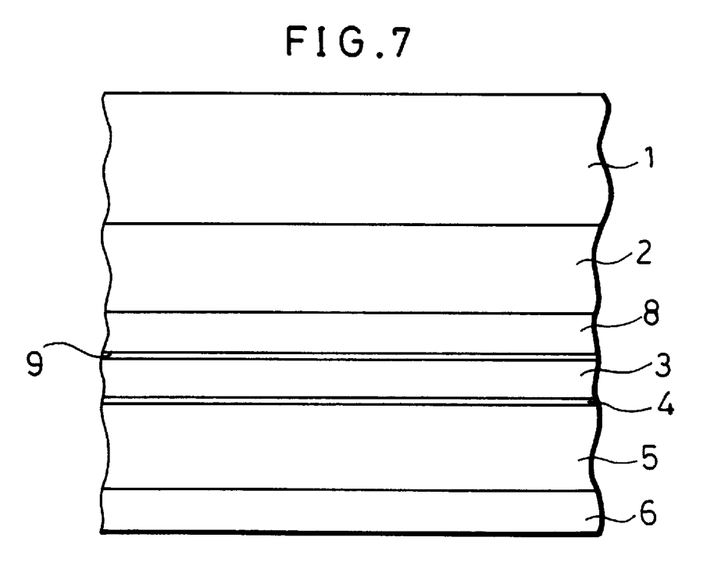
FIG. 7 is a schematic view illustrating an arrangement of still another magneto-optical disk as a magneto-optical recording medium of the present invention.

The following description will discuss another embodiment of the present invention with reference to FIG. 7. The members having the same structure (function) as those in the above-mentioned embodiment will be designated by the same reference numerals and their description will be omitted.

As illustrated in FIG. 7, a magneto-optical disk (magneto-optical recording medium) of the present embodiment has the same configuration as that of the third embodiment except that a second interface layer 9 is provided between the first magnetic layer 3 and the reproduction magnetic layer 8.

A magneto-optical disk sample as an example of the magneto-optical recording medium is depicted in the following description.

A magneto-optical disk of sample #6 has the second interface layer 9 which is made of Gd and has a thickness of 1 nm, between the first magnetic layer 3 and the reproduction magnetic layer 8 of sample #4.

A recording operation was carried out with respect to the magneto-optical disk of sample #6, under the following conditions:

strength of recording magnetic field Hw=40 kA/m;

high power Ph of laser beam 10 mW;

low power Pl of laser beam=1 mW;

reproduction power Pr of laser beam=1 mW; and recording bit length=0.78 µm.

As a result, the light modulation overwriting could be carried out without inadequate erasing of pre-recorded information, with the use of the recording magnetic field having a smaller strength than that for the magneto-optical disk of sample #4. It can be considered that since the second interface layer 9 made of Gd was provided between the first magnetic layer 3 and the reproduction magnetic layer 8, the light modulation overwriting could be carried out smoothly.

[Sixth Embodiment]

Figure 8:
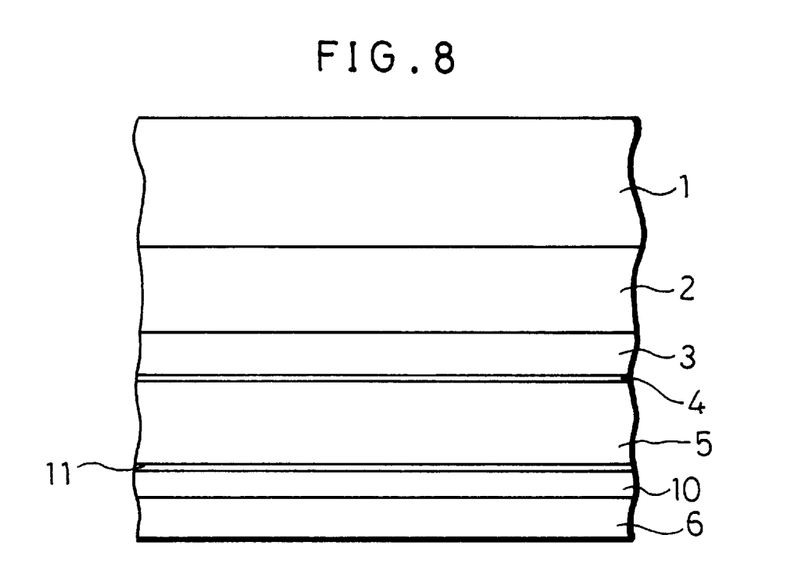
FIG. 8 is a schematic view illustrating an arrangement of still another magneto-optical disk as a magneto-optical recording medium of the present invention.

The following description will discuss another embodiment of the present invention with reference to FIG. 8. The members having the same structure (function) as those in the above-mentioned embodiment will be designated by the same reference numerals and their description will be omitted.

As illustrated in FIG. 8, a magneto-optical disk (magneto-optical recording medium) of the present embodiment has the same configuration as that of the first embodiment except that a supplementary magnetic layer 10 is provided between the second magnetic layer 5 and the protective layer 6, and that a third interface layer 11 is provided between the second magnetic layer 5 and the supplementary magnetic layer 10.

A magneto-optical disk sample as an example of the magneto-optical recording medium is depicted in the following description.

A magneto-optical disk of sample #7 has the supplementary magnetic layer 10 which is made of Co and has a thickness of 20 nm, and the third interface layer 11 which is made of Gd and has a thickness of 1 nm, between the second magnetic layer 5 and the protective layer 6 of sample #1. The second magnetic layer 5 is 60 nm thick.

A recording operation was carried out with respect to the magneto-optical disk of sample #7, under the following conditions:

strength of recording magnetic field Hw=40 kA/m;

high power Ph of laser beam=10 mW;

low power Pl of laser beam=1 mW;

reproduction power Pr of laser beam=1 mW; and recording bit length=0.78 µm.

As a result, the light modulation overwriting could be carried out without inadequate erasing of pre-recorded information, with respect to the magneto-optical disk of sample #7 whose total thickness is smaller than that of the magneto-optical disk of sample #1. It can be considered that since the supplementary magnetic layer 10 was provided between the second magnetic layer 5 and the protective layer 6, the magnetic fields generated thereabout were increased, thereby causing the light modulation overwriting to be smoothly carried out.

In the first through sixth embodiments, glass was used as the substrate 1 in samples #1 through #7. Alternatively, chemically tempered glass, a so-called 2P layered glass substrate produced by providing an ultraviolet ray hardening resin film on a substrate made of glass or chemically tempered glass, polycarbonate (PC), polymethyl methacrylate (PMMA), amorphous polyolefin (APO), polystyrene (PS), polyvinyl chloride (PVC), epoxy, or the like may be used as material for the substrate 1.

The thickness of the transparent dielectric layer 2 made of AlN is not restricted to 80 nm. The thickness of the transparent dielectric layer 2 is determined in consideration of the so-called Kerr effect enhancement, namely, a phenomenon that during reproducing operation with respect to a magneto-optical recording medium a polar Kerr rotation angle of light from the first magnetic layer or the reproduction magnetic layer is augmented by making use of an interference effect of light. In order to achieve as high a carrier-to-noise ratio as possible in reproduction, it is required to augment the polar Kerr rotation angle. For this reason, the thickness of the transparent dielectric layer 2 is set so that the greatest possible polar Kerr rotation angle is obtained.

In addition to the above-described role in relation to the Kerr effect enhancement, the transparent dielectric layer 2 in combination with the protective layer 6 prevents the oxidization of the first and second magnetic layers, the reproduction magnetic layer, and the supplementary magnetic layer, which are respectively made of rare earth-transition metal alloys.

Furthermore, an AlN film may be obtained by a reactive DC (direct current) sputtering which is carried out by using an Al target and introducing $N_2$ gas or mixed gas of Ar and $N_2$. This sputtering method has an advantage that a higher film forming speed can be achieved compared with the RF (radio frequency) sputtering method.

Other than AlN, the following substances are suitable as material of the transparent dielectric layer 2: SiN, AlSiN, AlTaN, SiAlON, TiN, TiON, EN, ZnS, $TiO_2$, $BaTiO_3$, $SrTiO_3$, and others. The use of SiN, AlSiN, AlTaN, TiN, BN, and ZnS, among others, ensures that magneto-optical disks which have an excellent moisture resistance are provided, since the same do not include oxygen in their respective compositions.

The respective compositions for the first magnetic layer, the second magnetic layer, and the reproduction magnetic layer are not restricted to these shown in the above embodiments. The same effect can be obtained by using an alloy which is a combination of at least one element selected from the rare-earth metal group consisting of Gd, Tb, Dy, Ho, and Nd and at least one element selected from the transition metal group consisting of Fe and Co. Furthermore, by adding at least one element selected from the group consisting of Cr, V, Nb, Mn, Be, Ni, Ti, Pt, Rh, and Cu to the above alloys, the respective resistances to environment of the rare earth-transition metal alloys are enhanced. Namely, the deterioration of the properties due to the oxidation of the material by moisture and oxygen being entered can be prevented, thereby ensuring a reliable performance of the magneto-optical disk for a long period of time.

The respective film thicknesses of the first and second magnetic layers and the reproduction magnetic layer are determined by considering the correlation among the materials used for the same, and the compositions thereof, and are not restricted to the thicknesses described above.

The respective material and film thicknesses of the interface layers are not restricted to those described above. Any rare-earth metal may be suitable as material of the interface layers provided that the light modulation overwriting is smoothly carried out. As combinations of not less than two rare-earth metals as material for the interface layer, the following can be given as examples: Gd and Tb; Gd and Dy; Tb and Dy; Nd and Gd; Nd and Dy; and, Nd and Tb.

The material and film thickness of the supplementary magnetic layer is not restricted to those described above. Any soft magnetic material may be suitable as material of the supplementary magnetic layer provided that it ensures that the total thickness of the magneto-optical disk is reduced. As material for the supplementary magnetic layer, Ni, Cr, or the like can be given as examples, other than Co.

The thickness of the AlN film as the protective layer 6 was set to 80 nm in the present embodiments, but it is not restricted to as such. The film thickness of the protective layer 6 is preferably set to or above 1 nm and to or below 200 nm.

The thermal conductivity of the protective layer 6 as well as that of the transparent dielectric layer 2 affects the recording sensitivity of the magneto-optical disk. Specifically, the recording sensitivity represents the laser power required for recording or erasion. Light incident on the magneto-optical disk is mainly transmitted through the transparent dielectric layer 2. Then, it is absorbed by the first and second magnetic layers and the reproduction magnetic layer or the supplementary magnetic layer, which are absorbing films. The light thus absorbed is changed into heat there. Here, the heat thus generated is transmitted through the transparent dielectric layer 2 and the protective layer 6 by thermal conduction. Therefore, the respective thermal conductivities and the thermal capacities (specific heat) of the transparent dielectric layer 2 and the protective layer 6 affect the recording sensitivity.

This means that the recording sensitivity of the magneto-optical disk can be controlled to some extent by adjusting the film thickness of the protective layer 6. For example, by making the protective layer 6 thinner, the recording sensitivity can be improved (recording or erasing operation can be carried out with a lower laser power). Normally, in order to extend the life of the laser, it is preferable to have relatively high recording sensitivity, and thus the thinner protective layer 6 is preferable.

In this sense also, AlN is suitable material. Because of its excellent moisture resistance, by using it as material of the protective film 6; it is possible to reduce the film thickness and to provide the magneto-optical disk which ensures a high recording sensitivity. When the protective layer 6 as well as the transparent dielectric layer 2 is made of AlN as is the case with the present embodiments, it is possible to provide a magneto-optical disk which has an excellent moisture resistance, and to enhance the productivity by producing the protective layer 6 and the dielectric layer 2 with the same material.

In considering the above objective and effect, other than AlN, the following substances which can be used also as material of the transparent dielectric layer 2 are suitable as material of the protective layer 6: SiN, AlSiN, AlTaN, SiAlON, TiN, TiON, BN, ZnS, $TiO_2$, $BaTiO_3$, $SrTiO_3$, and others. The use of SiN, AlSiN, AlTaN, TiN, BN, and ZnS, among others, ensures that magneto-optical disks have excellent moisture resistance, since any of the above substances does not include oxygen in the composition thereof.

The magneto-optical disks of samples #1 through #7 are so-called single-sided type. Hereinafter a thin film composed of the transparent dielectric layer, the first magnetic layer, the second magnetic layer, the reproduction magnetic layer, the supplementary magnetic layer, and the protective layer is referred to as a recording medium layer. Accordingly, the magneto-optical disk of the single-sided type is composed of the substrate 1, the recording medium layer, and the overcoat layer.

On the other hand, a magneto-optical disk composed of two substrates whereon recording medium layers are respectively laminated is called double-sided type, the two substrates being combined with an adhesive layer therebetween so that respective recording medium layers are oppositely provided.

As material for the adhesive layer, polyurethane acrylate adhesive is especially suitable. The above adhesive layer has a combination of hardening properties obtained by ultraviolet ray, heat and anaerobic. Therefore, this adhesive layer has an advantage that a portion of the adhesive layer shaded by the recording medium, to which the ultraviolet ray is not transmitted, can be hardened by heat and anaerobic hardening properties. Because of its high moisture resistance thus obtained, a reliable performance of the magneto-optical disk can be ensured for a long period of time.

The magneto-optical disk of the single-sided type is suitable for the use with a compact magneto-optical recording and reproducing apparatus because the disk of the single-sided type has a thickness of half of that of the double-sided type. In contrast, the disk of the double-sided type is suitable for the use with a recording and reproducing apparatus requiring a large capacity because it is possible to record to and reproduce from the both sides.

Although the magneto-optical disks are used as examples of the magneto-optical recording media so as to embody the present invention, the present invention is also applicable to a magneto-optical tape and a magneto-optical card.

Furthermore, in the case where any one of the second through fifth embodiments and the sixth embodiment are combined, a magneto-optical disk thus produced has advantages of both the embodiments, although the manufacturing processes become complicated.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A magento-optical recording medium comprising:

a substrate;

a first magnetic layer exhibiting a perpendicular magnetization from room temperature to a Curie temperature thereof;

a second magnetic layer having a coercive force smaller than that of said first magnetic layer at room temperature, having a Curie temperature higher than that of said first magnetic layer, and exhibiting a perpendicular magnetization from room temperature to around a Curie temperature of said second magnetic layer, said substrate, said first magnetic layer, and said second magnetic layer being provided in this order, and wherein portions of said first and said second magenetic layers in the vicinity of an interface therebetween, having a higher content of at least one rare-earth metal than a content of the rare-earth metal in the vicinity of the rare-earth metal in the vicinity of the center of said second magnetic layer.

2. The magneto-optical recording medium as set forth in claim 1, wherein:

said first magnetic layer, made of a rare earth-transition metal alloy, is transition metal rich from room temperature to the Curie temperature thereof; and said second magnetic layer, made of a rare earth-transition metal alloy, has a compensation temperature falling in a temperature range between room temperature and the Curie temperature thereof.

3. The magneto-optical recording medium as set forth in claim 1, wherein:

said first magnetic layer is made of a rare earth-transition metal alloy; and said second magnetic layer, made of a rare earth-transition metal alloy, has a compensation temperature at about a reproduction temperature, the reproduction temperature being a temperature to which an area of said magneto-optical recording medium is heated so that information is reproduced from the heated area.

4. A magneto-optical recording medium as set forth in claim 1, further comprising a reproduction magnetic layer having a Curie temperature higher than that of said first magnetic layer and exhibiting a perpendicular magnetization from room temperature to the Curie temperature of said reproduction magnetic layer, said first magnetic layer having a first and second surfaces, said reproduction magnetic layer being provided on the first surface of said first magnetic layer, the first surface being opposite to the second surface on which side said second magnetic layer is provided.

5. A magento-optical recording medium as set forth in claim 4, wherein portions of said first magnetic layer and said reproduction layer in the vicinity of an interface therebetween, having a higher content of at least one rare-earth metal than a content of the rare-earth metal in the vicinity of the center of said first magnetic layer and said reproduction layer.

6. A magneto-optical recording medium as set forth in claim 1, further comprising a reproduction magnetic layer having a Curie temperature higher than that of said first magnetic layer and exhibiting an in-plane magnetization at room temperature while exhibiting a perpendicular magnetization at a temperature not lower than a predetermined temperature, said first magnetic layer having first and second surfaces, said reproduction magnetic layer being provided on the first surface of said first magnetic layer, the first surface being opposite to the second surface on which side said second magnetic layer is provided.

7. A magneto-optical recording medium as set forth in claim 6, wherein portions of said first magnetic layer and said reproduction layer in the vicinity of an interface therebetween, having a higher content of at least one rare-earth metal than a content of the rare-earth metal in the vicinity of the center of said first magnetic layer and said reproduction layer.

8. A magento-optical recording medium as set forth in claim 1, further comprising:

a supplementary magnetic layer made of a soft magnetic substance and being provided on a first surface of said second magnetic layer, said second magnetic layer having the first surface and a second surface, the first surface being opposite to the second surface on which side said first magnetic layer is provided; and wherein portions of said second magnetic layer and said supplementary magnetic layer in the vicinity of an interface therebetween, having a higher content of at least one rare-earth metal than a content of the rare-earth metal in the vicinity of the center of said second magnetic layer and said supplementary magnetic layer.

9. A magneto-optical recording method for carrying out light modulation overwriting with respect to a magneto-optical recording medium having in this order a first magnetic layer, a first interface layer and a second magnetic layer, the first interface layer being made of at least one rare-earth metal and having a thickness smaller than thicknesses of the first and second magnetic layers, the second magnetic layer having a coercive force at room temperature smaller than that for the first magnetic layer and a Curie temperature higher than the first magnetic layer, said magneto-optical recording method comprising the steps of:

(a) modulating light intensity of a laser beam to a low level such that an irradiated area of the magneto-optical recording medium is heated to a temperature not lower than around the Curie temperature of the first magnetic layer, and projecting the laser beam to the magneto-optical recording medium; and (b) modulating light intensity of the laser beam to a high level such that an irradiated area of the magnet-optical recording medium is heated to a temperature not lower than around the Curie temperature of the second magnetic layer, and projecting the laser beam to the magneto-optical recording medium.

10. The magneto-optical recording method as set forth in claim 9, wherein, in said step (a), the irradiated area of said magneto-optical recording medium is heated to a temperature not lower than around the Curie temperature of the first magnetic layer and not higher than around the Curie temperature of the second magnetic layer.

11. A magneto-optical recording medium comprising:

a substrate a first magnetic layer exhibiting a perpendicular magnetization from room temperature to a Curie temperature thereof;

a second magnetic layer having a coercive force smaller than that of said first magnetic layer at room temperature, having a Curie temperature higher than that of said first magnetic layer, and exhibiting a perpendicular magnetization from room temperature to around a Curie temperature of said second magnetic layer;

said substrate, said first magnetic layer, and said second magnetic layer being provided in this order; and wherein in one said first magnetic layer or said second magnetic layer, a content of the rare-earth metal increases in the vicinity of an interface between said first and second magnetic layers, as compared with that in the vicinity of the centers of the first and second magnetic layers.

12. The magneto-optical recording medium as set forth in claim 11, wherein:

said first magnetic layer, made of a rare earth-transition metal alloy, is transition metal rich from room temperature to the Curie temperature thereof; and said second magnetic layer, made of a rare earth-transition metal alloy, has a compensation temperature falling in a temperature range between room temperature and the Curie temperature thereof.

13. The magneto-optical recording medium as set forth in claim 11, wherein:

said first magnetic layer is made of a rare earth-transition metal alloy; and said second magnetic layer, made of a rare earth-transition metal alloy, has a compensation temperature at about a reproduction temperature, the reproduction temperature being a temperature to which an area of said magneto-optical recording medium is heated so that information is reproduced from the heated area.

14. A magneto-optical recording medium as set forth in claim 11, further comprising a reproduction magnetic layer having a Curie temperature higher than that of said first magnetic layer and exhibiting a perpendicular magnetization from room temperature to the Curie temperature of said reproduction magnetic layer, said first magnetic layer having first and second surfaces, said reproduction magnetic layer being provided on the first surface of said first magnetic layer, the first surface being opposite to the second surface on which side said second magnetic layer is provided.

15. A magneto-optical recording medium as set forth in claim 14, wherein in one of said first magnetic layer and said reproduction magnetic layer, a content of the rare-earth metal increases in the vicinity of an interface between said first magnetic layer and said reproduction magnetic layer, as compared with that in the vicinity of the centers of the first magnetic layer and said reproduction magnetic layer.

16. A magneto-optical recording medium as set forth in claim 11, further comprising a reproduction magnetic layer having a Curie temperature higher than that of said first magnetic layer and exhibiting and in-plane magnetization at room temperature while exhibiting a perpendicular magnetization at a temperature not lower than a predetermined temperature, said first magnetic layer having first and second surfaces, said reproduction magnetic layer being provided on the first surface of said first magnetic layer, the first surface being opposite to the second surface on which side said second magnetic layer is provided.

17. A magneto-optical recording layer as set forth in claim 16, wherein in one of said first magnetic layer and said reproduction magnetic layer, a content of the rare-earth metal increases in the vicinity of an interface between said first magnetic layer and said reproduction magnetic layer, as compared with that in the vicinity of the centers of the first magnetic layer and said reproduction magnetic layer.

18. A magneto-optical recording medium as set forth in claim 11, further comprising:

a supplementary magnetic layer made of a soft magnetic substance;

said supplementary magnetic layer being provided on a first surface of said second magnetic layer, said second magnetic layer having the first surface and a second surface, the first surface being opposite to the second surface on which side said first magnetic layer is provided; and wherein in said second magnetic layer, a content of the rare-earth metal increases in the vicinity of an interface between said supplementary magnetic layer and said second magnetic layer, as compared with that in the vicinity of the centers of said second magnetic layer.

19. A magneto-optical recording method for carrying out light modulation overwriting with respect to a magneto-optical recording medium having in this order a first magnetic layer and a second magnetic layer, wherein in one the first magnetic layer or the second magnetic layer, a content of the rare-earth metal increases in the vicinity of an interface between said first and second magnetic layers, as compared with that in the vicinity of the centers of the first and second magnetic layers and the second magnetic layer having a coercive force at room temperature smaller than that for the first magnetic layer and a Curie temperature higher than the first magnetic layer, said magneto-optical recording method comprising the steps of:

(a) modulating light intensity of a laser beam to a low level such that an irradiated area of the magneto-optical recording medium is heated to a temperature not lower than around the Curie temperature of the first magnetic layer, and projecting the laser beam to the magneto-optical recording medium; and (b) modulating light intensity of the laser beam to a high level such that an irradiated area of the magneto-optical recording medium is heated to a temperature not lower than around the Curie temperature of the second magnetic layer, and projecting the laser beam to the magneto-optical recording medium.

20. The magneto-optical recording method as set forth in claim 19, wherein, in said step (a), the irradiated area of the magneto-optical recording medium is heated to a temperature not lower than around the Curie temperature of the first magnetic layer and not higher than around the Curie temperature of the second magnetic layer.

* * * * *